UNITED STATES PATENT OFFICE.

PHILIPP MÜLLER, OF FRANKFORT-ON-THE-MAIN, GERMANY, ASSIGNOR TO HEINRICH FINKELSTEIN AND LUDWIG F. MEYER, OF BERLIN, GERMANY.

MANUFACTURE OF ALIMENTARY PRODUCTS.

1,061,488.     Specification of Letters Patent.     Patented May 13, 1913.

No Drawing.     Application filed March 7, 1910. Serial No. 547,772.

*To all whom it may concern:*

Be it known that I, PHILIPP MÜLLER, merchant, residing at Wingertstrasse 3, Frankfort-on-the-Main, Germany, have invented new and useful Improvements in the Manufacture of Alimentary Products, of which the following is a specification.

The methods hitherto in use for improving cows' milk for the purpose of rendering it suitable as a food more particularly for infants aim either at rendering the cows' milk more digestible by diluting it with water or at setting up a kind of preliminary digestive process by treatment of the milk with chemical agents. Both of these methods arise from the assumption that the casein in particular of cows' milk is very difficult to adapt to the conditions existing in the intestinal canal of infants. These methods, however, are attended by drawbacks; either the albumin being fed to the infants in an excessively dilute condition, or the milk in consequence of its treatment with foreign substances, acting more as a medicine than as a food.

Recent scientific investigations (especially the researches of Professor Finkelstein, *Alimentaire Intoxication, Jahrbuch der Kinderheilkunde* (Berlin, S. Karger), 1906-1907, vol. 65, p. 1, vol. 66, p. 1, *et seq.,*) have shown that the casein of cows' milk agrees well with normal infants and is assimilated by them. This having long been known to be true as regards milk fat, it follows that the disturbances which are nevertheless, often produced by diet of pure cows' milk, must be attributable to the mineral constituents (especially the salts) and to the milk sugar of the cows' milk. Cows' milk contains salts in far greater quantity and in less readily soluble form than human milk, and at the same time the minimum of the percentage of milk sugar is much higher in cows' milk than in human milk.

According to the present invention, the sugar content of the milk is not to be higher than the well-known minimum of mothers' milk, and this minimum is very much below the minimum of cows' milk. This minimum, 1.8%, is present in mothers' milk at the beginning of the nursing period, that is to say, in the first weeks after birth, and rises as the nursing period advances. The minimum of sugar in cows' milk is very much higher than that in mothers' milk. The maximum proportion is of no moment, because older children are not subject to digestive disturbances as are very young infants.

The method forming the subject of the present invention has for its object to render cows' milk more digestible and suitable as a food for infants, by extracting the greater portion of the salts and sugar, while leaving the total fat and casein content intact.

The method of this invention is carried out in the following manner:—

A certain quantity of whole milk is treated with rennet, allowing it to stand for a short time at about 40° centigrade, and then separating the precipitated mass of curd (casein and fat) by filtration from the whey, if necessary by the aid of a suction apparatus or a suitable centrifugal machine. The resulting curd mass, free from salts and sugar, is next distributed, in a very finely divided condition, through a quantity of buttermilk thinned with water, by gradual but thorough stirring; the mixture of buttermilk and water being preferably compounded of equal quantities of these liquids and corresponding in volume to that of the whole milk originally taken.

Example: The curd mass (casein and fat freed from salt and sugar) of 10 liters whole milk is very finely divided and distributed through a mixture of 5 liters buttermilk thinned with 5 liters water by gradual but thorough stirring. The milk obtained in this manner therefore contains, per liter, the casein from 1½ liters of milk (the whole milk and the buttermilk), the fat from 1 liter of milk (the original whole milk), and the sugar and salts from ½ liter of buttermilk. It is accordingly richer in readily digestible curd, but poorer in salts and in milk sugar (which assists fermentation) than ordinary cows' milk. In the manner before described a cows' milk is obtained whose casein and fat content may be variable at will.

The reason for preferring buttermilk as the medium for distributing the curd produced from the whole milk is, that buttermilk contains a higher proportion of ferments than skim milk, so that the infants' milk prepared by this method is also more digestible than it would be if skim milk were used.

In conclusion, it is to be observed that, by means of the present method, a milk is obtained whose composition is in harmony with present-day scientific requirements, and which is suitable as a constant food for infants. A further advantage of the method consists in the fact that the digestibility of milk prepared and compounded as described, is not so adversely affected by sterilization as is the case with ordinary cows' milk.

Having thus described my invention, what I claim and desire to secure by Letters Patent, is—

The herein described process of manufacturing a cows' milk, low in salts and sugar, but with a normal fat and casein content, especially adapted as a food for infants, consisting in precipitating the curd mass from a given quantity of whole milk, and mixing the same with a mixture of equal parts of buttermilk and water, the volume of the mixture being substantially equal to the volume of the whole milk from which the curd was precipitated, substantially as and for the purpose described.

In testimony, that I claim the foregoing as my invention I have signed my name in presence of two witnesses, this 12th day of February, 1910.

PHILIPP MÜLLER.

Witnesses:
RUDOLPH FRICKE,
ALBERT ROSMAN.